United States Patent
Miller et al.

(10) Patent No.: US 6,327,304 B1
(45) Date of Patent: Dec. 4, 2001

(54) APPARATUS AND METHOD TO DIGITALLY COMPRESS VIDEO SIGNALS

(75) Inventors: Daniel B. Miller; Victor Yurkovsky, both of New York, NY (US)

(73) Assignee: The Duck Corporation, New York, NY (US)

( * ) Notice: Subject to any disclaimer, the term of this patent is extended or adjusted under 35 U.S.C. 154(b) by 0 days.

(21) Appl. No.: 09/353,864

(22) Filed: Jul. 15, 1999

Related U.S. Application Data

(62) Division of application No. 08/060,613, filed on May 12, 1993.

(51) Int. Cl.$^7$ ................................................... H04N 7/12
(52) U.S. Cl. ................................................. 375/240.12
(58) Field of Search ........................... 348/409; 358/403; 375/240, 240.23, 240.12

(56) References Cited

U.S. PATENT DOCUMENTS 5,083,214 * 1/1992 Knowles ............................. 358/403
5,136,376 * 8/1992 Yagasaki et al. ................ 375/240.23

* cited by examiner

Primary Examiner—Chris Kelley
Assistant Examiner—Allen Wong
(74) Attorney, Agent, or Firm—Levisohn, Lerner, Berger & Langsam

(57) ABSTRACT

A method and apparatus is disclosed for digitally compressing video signals. The method and apparatus provides a system which generates values related to the differences between respective pixel locations in an x, y pixel display. The differences generated between proximate pixel locations are used to generate various delta values which are encoded in an asymmetric fashion. The asymmetric coding eliminates artifacts in the displayed image, and the delta encoding is performed in both a horizontal and vertical direction. Errors due to the compression process are distributed randomly in both horizontal and vertical directions, approximating the effect of analog media such as video and especially film.

2 Claims, 7 Drawing Sheets

PRE-ENCODE PROCESS DIAGRAM

| | |
|---|---|
| I | INPUT PIXEL (CORRECTED) |
| T | TOP PIXEL (DECODED) |
| O | OUTPUT PIXEL (DECODED) |
| $V_p$ | PREVIOUS VERTICAL DIFFERENCE |
| $V_i$ | NEW VERTICAL DIFFERENCE (INPUT) |
| $V_o$ | VERTICAL DIFFERENCE |
| $\Delta V_o$ | DELTA BETWEEN $V_p$ AND $V_i$ |
| $\Delta V_q$ | QUANTIZED DELTA |
| S | CODED SYMBOL |
| E | LOSSLESS-ENCODED BITSTREAM |

*FIG. 3A*

TABLE OF COMPRESSED VALUES

| | 1 | 2 | 3 |
|---|---|---|---|
| A | O = 50 | O = 46 | O = 65 |
| B | VO = +30<br><br>O = 80 | I = 83<br>T = 46<br>$V_i$ = +37<br>$V_p$ = +30<br>$\Delta V$ = +7<br>$\Delta V_q$ = +8 S = 2<br>$\Delta V_o$ = +38 E = 1100<br><br>O = 84 | I = 92<br>T = 65<br>$V_i$ = +27<br>$V_p$ = +38<br>$\Delta V$ = −11<br>$\Delta V_q$ = −8 S = 3<br>$\Delta V_o$ = +30 E = 1101<br><br>O = 95 |
| C | VO = +10<br><br>O = 90 | I = 90<br>T = 84<br>$V_i$ = +6<br>$V_p$ = +10<br>$\Delta V$ = −4<br>$\Delta V_q$ = −3 S = 1<br>$\Delta V_o$ = +7 E = 10<br><br>O = 91 | I = 106<br>T = 95<br>$V_i$ = +11<br>$V_p$ = +7<br>$\Delta V$ = +4<br>$\Delta V_q$ = +2 S = 0<br>$\Delta V_o$ = +9 E = 0<br><br>O = 104 |

*FIG. 4*

QUANTIZATION TABLE AND OUTPUT CODE

DELTAS: −36, −18, −8, −3, +2, +8, +18, +36

DECISION RULE:

| ACTUAL DELTA | DELTA | OUTPUT | |
|---|---|---|---|
| Δv | Vq | S | E |
| < −30 | −36 | 7 | 11111 |
| < 14, > = −30 | −18 | 5 | 11101 |
| < −5, > = −14 | −8 | 3 | 1101 |
| < 0, > = −5 | −3 | 1 | 10 |
| < = 5, > = 0 | +2 | 0 | 0 |
| < = 14, > 5 | +8 | 2 | 1100 |
| < = 30, > 14 | +18 | 4 | 11100 |
| > 30 | +36 | 6 | 11110 |

*FIG. 5*

APPARATUS AND METHOD TO DIGITALLY COMPRESS VIDEO SIGNALS

CROSS REFERENCE TO RELATED APPLICATIONS

This application is a divisional of prior pending application Ser. No. 08/060,613 filed May 12, 1993 and claims the priority thereof.

BACKGROUND OF THE INVENTION

The invention relates generally to a method of and apparatus for coding and compressing information. More specifically, the invention relates to a method for coding and compressing digital signal data, such as digitized video images, for storage and transmission. While the following discussion refers to compression of digitized video images, it is to be understood that the invention is not restricted to video data, and may produce benefits in other fields where compression is used.

As the digital revolution has spread to many industries and technologies, the need to transmit, store and manipulate large amounts of data has grown. Consequently, there have been many attempts to code and/or compress data in order to reduce the necessary storage capacity, transmission rate, and processing speed to perform a given task.

For example, one of the fields that has recently developed a need for intensive digital data handling is video technology. This field includes applications such as the transmission of real time video over telephone lines for teleconferencing and the use of digital video-transmission for home television viewing as well as interactive television and computer applications. Presently, there are limitations imposed by the quality and available bandwidth of existing transmission lines as well as capacity and data throughput of storage devices necessary to store and transmit image data.

To reduce the data capacity requirements of such video systems and/or improve performance of systems with limited data capacity, various methods have been devised. So-called "lossless" compression methods rely on redundancies within the data, for instance by assigning a single code to represent an entire block of data that may repeat several times. Other methods are considered "lossy," because some of the data is lost in the compression/decompression process resulting in images that differ from the originals. Both methods are useful and practical and are commonly used together to create an effective compression system.

In the compression of video images, known lossy techniques produce undesirable effects in the final decompressed image, such as pixellation and posterization. These undesirable effects are known as 'artifacts'. Pixellation occurs when the number of stored pixels is reduced for the total image, i.e., the resolution is decreased, leading to jagged lines and squared-off curves. Posterization occurs when the number of values representing pixel brightness and color is reduced. For example, typical digitized monochrome video images normally have 256 shades of gray. If that number is reduced to 16 or 32 for the same image, areas with smooth shading gradations now have regions of uniform shade, and transitions from one shade to the next are obvious. Other lossy techniques, such as using a low-pass filter to eliminate high-frequency noise, also eliminate the high-frequency portion of the image, making it muddy and lacking in detail.

To better preserve the quality of the image, others have applied lossless compression methods. However, when the process necessarily includes analog components (cameras, tape equipment, etc.), these methods are overkill. Any analog component, even the analog-to-digital (A/D) converters used to digitize an image, will add a certain amount of noise to the digital data captured, and this amount of noise varies from system to system. Lossless compression methods compress, transmit and decompress this noise accurately, along with the "good" data, at great expense in storage and processing requirements. Some complex and noisy images can even be larger in their "compressed" form than when not compressed with some methods. Unfortunately, there is no obvious way to determine what is noise and what is data once the digital signal is produced; to the system, it is all data. It is possible, although complicated, to use various forms of "dithering" with filtered data to add a somewhat random or pseudo-random aspect to the reproduced image, hopefully ameliorating some of the effects of filtering and posterization. Often, these methods involve the addition of a separate machine generated random signal during compression and/or decompression. Of course, this requires many additional components and method steps, driving up the costs and slowing down maximum processing speeds.

One relatively simple compression scheme well known in the art is called "delta encoding". Although primarily used in compression of digitized audio signals, several attempts have been made to apply the principle to the compression of image data. In delta encoding, a series of data values are encoded as a first value and a series of differences, or deltas, between each value and the next subsequent value. Delta encoding holds advantages when used in conjunction with lossless compression means such as Huffman coding, known in the art, which take advantage of the statistical frequency of values in a series to achieve data compression. The advantage of delta encoding arises from the fact that the frequency distribution of the differences between subsequent values in a series is often much less uniform than the distribution of the actual values, and in many cases this provides substantial gain in the compression of such data.

So far, what has been described with delta encoding is a lossless compression method, in that the decoded values will be identical to the encoded values. Limiting the allowable delta values which can be encoded to a subset of the possible delta values comprises a 'lossy' compression process known as delta quantization. The quantizing function must include a means of choosing one of the allowable deltas if the actual delta is not equal to any of them; a simple and effective rule is to choose the allowable delta closest to the actual delta. It should be noted that when using delta quantization, the error, or difference between the input pixel value and the corresponding decoded value, must be added into the next delta prior to quantization; this error is therefore being incorporated into subsequently processed pixel values, which is to say the error is being distributed in the direction corresponding to pixel processing. An equivalent way of achieving this is to produce each delta not by taking the difference between subsequent pixel values in the original image, but by taking the difference between the present pixel value and the last decoded pixel value, which is often maintained anyway by the compression apparatus for reference display.

Drawbacks of delta quantization particularly as applied to images are: reduced spatial frequency response, posterization, and edge artifacts. Frequency response is dependent on the size of the largest allowable delta values; posterization results from the choice of the smallest values; and edge artifacts result from both of these factors as well as from the fact that previous delta encoding schemes distribute error in a single spatial dimension.

Furthermore, the existence of substantial noise elements introduced by the analog components of the video process (including grain from film sources) reduces the ability of delta encoding to produce an image of acceptable quality along with substantial data compression. The reason for this is that noise manifests itself primarily in the high-frequency domain, which creates a wide distribution of small differentials between subsequent data values. The designer of a digital video compression system using delta quantization techniques is faced with a dilemma: either allow a large number of small delta values to be used, resulting in less compression, or accept noticeable edge and posterization artifacts. For this reason, delta encoding for video compression has been limited to use in situations where the level of compression needed is small, or where image quality is not of paramount importance (certain computer applications).

Typically, where high levels of compression must be achieved, along with superior video quality, more complicated means have been pursued, including discrete cosine transform, vector quantization, wavelet, and other techniques known in the art. In addition, some compression systems as described above which aim at high levels of compression use inter-frame and motion estimation techniques, which further increase complexity and cost. A brief summary of the features of such complicated means is set forth:

Vector Quantization (VQ). A highly asymmetrical algoritlun often used on PCs. Results in poor quality video, although hardware to play it back can be produced cheaply. Vector quantization is computationally intensive on compression.

Fractal Compression The picture quality is poor, it is even more asymmetrical than VQ, and it is not possible to decompress fast enough to run video.

Wavelets This technology is capable of good quality video and is fairly equal in compression and decompression computation requirements, although these requirements are mathematically complex.

Discrete Cosine Transform This is the core of the JPEG still image standard and the elusive MPEG standard. Although quite complicated, this algorithm provides equal compression/decompression requirements and results in reasonable quality video. Block artifacts, however, are often obvious and annoying.

MPEG. As a potential standard, this is a version of DCT and bidirectional motion estimation. However, it is very complicated, highly computation-intensive for compression, and produces both spatial and temporal artifacts.

VQ is undesirable on the quality basis. The rest of the above technologies are prohibitively expensive for incorporation into mass-market consumer devices. MPEG in particular is undesirable because of the huge computational requirements necessary to achieve acceptable image quality.

The problems associated with noise are not solved by these systems; they merely manifest themselves in other ways than with delta encoding schemes. Complex filtering processes and quantization of frequency components can increase compression levels by reducing noise, but often create artificial-looking results and introduce artifacts such as texture baldness. Inter-frame and motion estimation techniques exacerbate the problem, causing artifacts such as blockiness and frozen noise.

SUMMARY OF THE INVENTION

It is the object of this invention to provide a digital video compression process that provides superior image quality with high levels of compression and is simple and cost-effective to implement and manufacture. Rather than use complex mathematical techniques which require equally complex apparatus to implement, and which, in the opinion of many in the business of producing and distributing recorded and transmitted video material, produce unacceptable results at prohibitive cost, the inventors have combined a novel form of delta encoding with a method of image analysis to create a process that closely approximates the characteristic appearance of analog image processes, especially film. In this way, the visual effect of the compression process is similar, and perhaps superior to, the effects of the analog process being replaced, whether it be video tape recording, motion picture film, or video transmission via broadcast or other means. Further, the compression and decompression processes can be performed relatively quickly so as to yield real time "on the fly" digital compression and decompression. While some prior systems are capable of quarter screen eight frame a second operation, such systems produce poor video quality. The system of the present invention is presently capable of full screen 60 fields per second operation that produces excellent video quality.

Among the important features of the invention is that the simplicity of the compression/decompression system allows for the system to be implemented on a customized ASIC (Application Specific Integrated Circuit). The benefits are easily visualized.

An average American family has one or more television sets, a cable converter, a VCR, and possibly a camcorder. There may also be a PC, and in the near future a CD-ROM device connected to the television set. That is, at least three analog devices per household are ripe for a digital replacement, and two more will be expected to provide high-quality digital video.

The typical thinking today is that since compression technology is complicated and expensive, a decompression box should be at the center of the home entertainment system, probably in the cable TV box. Since the decompressor now has to be shared by a number of devices, cumbersome standards are being advanced that propose to do everything for everybody. However, with the cost effective technology of the present invention, the balance is different. Each one of the above mentioned video devices could have a decompressor built in.

To draw an analogy, today's household has a tuner in every television set, every cable TV box, and every VCR, even though typically only one is used. It is simply cheaper for the manufacturer to build the tuner into every device than to count on the compatibility between different devices and guide the consumer through wiring all these devices to share one tuner.

Based on this approach, an advantage of the present invention is that it can be implemented on a low cost custom ASIC, which could be installed in consumer products. Indeed, the present system can be implemented using 100,000 gates or less, using low-cost integrated circuit fabrication techniques.

In accordance with an object of the invention, a method of analysis of the analog components of the video pathway is provided, including the analog-to-digital and digital-to-analog circuits used, enabling the designer of the system to establish an effective range of possible decoded values for given encoded values, termed the Decoding Range, relating to the noise level inherent in the system.

Also in accordance with another object of the invention, a method and apparatus is disclosed which incorporates a novel form of delta encoding, utilizing parameters based on the Decoding Range to introduce a pseudo-random element to the decoded values while maintaining these values within the Decoding Range. There are two novel elements of the encoding process, termed Asymmetric Delta Quantization and Two-Dimensional Delta Encoding. While they may be used separately with benefit, they work synergistically to satisfy the objects of the invention. To elucidate the description of the invention, there follows a general overview of these two novel elements.

Asymmetric Delta Quantization is similar to Delta Quantization, except that certain of the allowable deltas have different magnitudes when they are negative than the corresponding positive values. This introduces the pseudo-random element. Typically, the magnitude of the two smallest delta values allowed will differ by 1, such as −2 and +1, or −3 and +2, corresponding to a Decoding Range of 3 or 5 respectively. Asymmetric Delta Quantization includes the added benefit that the unequal delta values are chosen with non-uniform frequency, which can increase the compression level of subsequent lossless compression such as Hufftnan Coding.

Asymmetric delta encoding may be described in more detail as follows. In order to reduce the data transmitted, a fixed value, such as +2, is transmitted for every delta falling in the range of 0 to +5 (See FIG. 5). Similarly, the fixed value +8 will be transmitted for each delta falling in the range of greater than +5 and less than or equal to +14. In the traditional delta encoding process, identical fixed negative and positive values would be transmitted when the deltas fall in the respective negative and positive ranges. With the present invention, the lowest positive and negative output codes representing the lowest corresponding positive and negative ranges are unequal and preferably are different by a value of one.

Two-Dimensional Delta Encoding expands the concept of delta encoding to include both horizontal and vertical axes. (Alternatively, one dimension could be temporal.) To perform delta encoding in both axes simultaneously, we generate a quantity called the Vertical Differential. The Vertical Differential shall be the difference between a given input pixel value, and the decoded pixel value directly above it. We then perform delta encoding, preferably using Asymmetric Delta Quantization, on subsequent Vertical Differentials from left to right for each row of pixels. To begin the process, we must record without compression the value of the first row of pixels and the first pixel value of each subsequent row. (Alternatively, we can initialize the first row and column to a fixed value, as described for the preferred embodiment.) By maintaining the value of the decoded pixels for each previous row, we effectively distribute error downwards as well as to the right (as explained earlier in regard to delta quantization, deriving deltas using decoded values for previous pixels is equivalent to incorporating an error term). In fact, it can be shown that the pseudo-random aspect of Asymmetric Delta Quantization, when used in conjunction with Two-Dimensional Delta Encoding, causes error to be distributed in both vertical and horizontal dimensions on a random basis with each pixel, creating a film-like granular look which is much preferable to the unnatural effect of delta encoding in one spatial dimension. It can also be shown that Two-Dimensional Delta Encoding is equivalent in both dimensions; the same result is obtained whether we process from left to right in each subsequent row, or choose to process each column from top to bottom—neither axis is preferred or emphasized in any way.

BRIEF DESCRIPTION OF THE DRAWINGS

The foregoing and other objects, features and advantages of the present invention will become apparent to those skilled in the art upon reading the following detailed description in conjunction with the appended drawings, in which:

FIG. 4 is a table of input, intermediate, and compressed output values for a subset of pixels from a representative image.

FIG. 5 is a table of representative delta quantization parameters with a random deviation of −3 to +2 (decoding range of 6), determined at block 14, FIG. 1.

DETAILED DESCRIPTION OF THE PREFERRED EMBODIMENT

For explanatory purposes, and for the purpose of standardizing the overall detailed description of the preferred embodiment, the analog input signal will be considered a monochrome video signal, converted into a stream of digital values from a set of 256 possible values, i.e., there are 256 shades of gray for each pixel or sample in the video image. It will be further understood that the signal preferably does not contain the video information necessary for the maintenance of the video signal, such as timing and synchronization signals. These signals would be removed before compression, and generated locally during decompression. The present invention is concerned with the data portion of the signal or the portion that determines the shades of gray at each pixel or sample. It should also be understood that the present invention is not limited to video signals, but can be applied to any analog or digital signal, although certain aspects of the present invention find great advantage for video signals.

Figure 1:
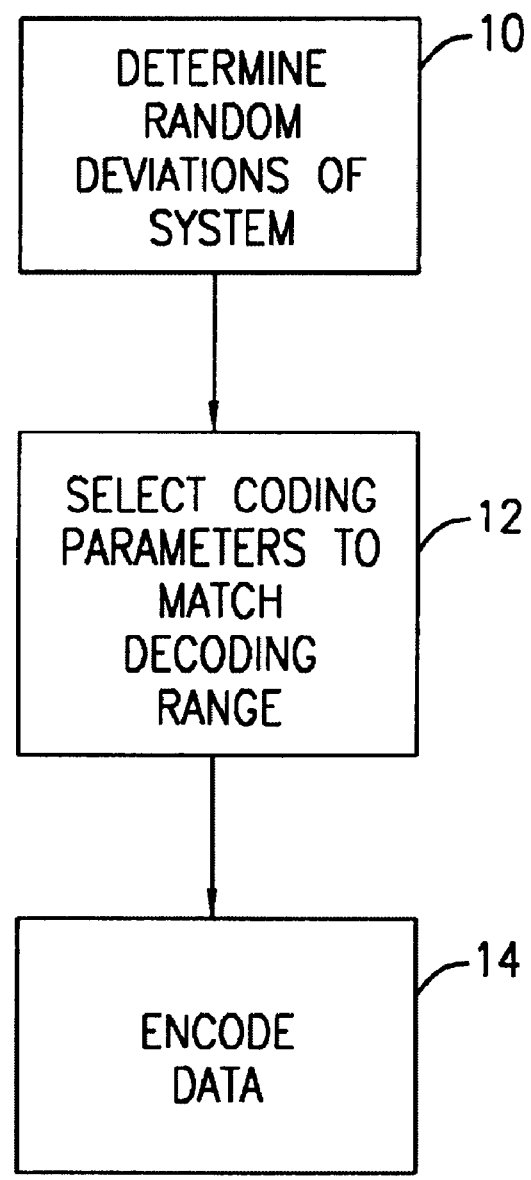
FIG. 1 is a schematic flow chart of a method according to the present invention.

Referring now to the drawings, FIG. 1 shows some of the general processes that are used in the practice of the preferred embodiment of the invention. Initially, it is necessary to determine the noise level, or random deviation, inherent to the particular analog system in use (block 10). There are known methods to determine this deviation, such as by imaging a flat card of one continuous shade. In a perfect system, the digitized values would all be the same for the entire video frame; by analyzing the actual sampled values, the random deviation can be determined. For example, if the average sampled value were 100, the individual samples might represent a range of 98 to 102, resulting in a random deviation of +/−2. This random deviation indicates the acceptable range within which a sample value must be decoded to avoid a noticeable increase in the noise level of the image. This decoding range is supplied to a system (12) which is used to select coding method parameters to match the random deviation of the system. The output of system 12 is supplied to data encoding block 14, so that these parameters are then used to compress the data in block 14.

The decoding range is not static, however. It can vary depending on the level of the signal and/or the difference between values, such as at an edge between contrasting areas. In the preferred system, the range or allowable error is also related, in part, to the level of the signal. Thus, it is preferred that the digitized values are processed first through a logarithmnic or similar function so that the decoding range will be substantially constant over the entire set of possible values, except for edges. (Discussed below, block 24 of FIG. 2).

Figure 2:
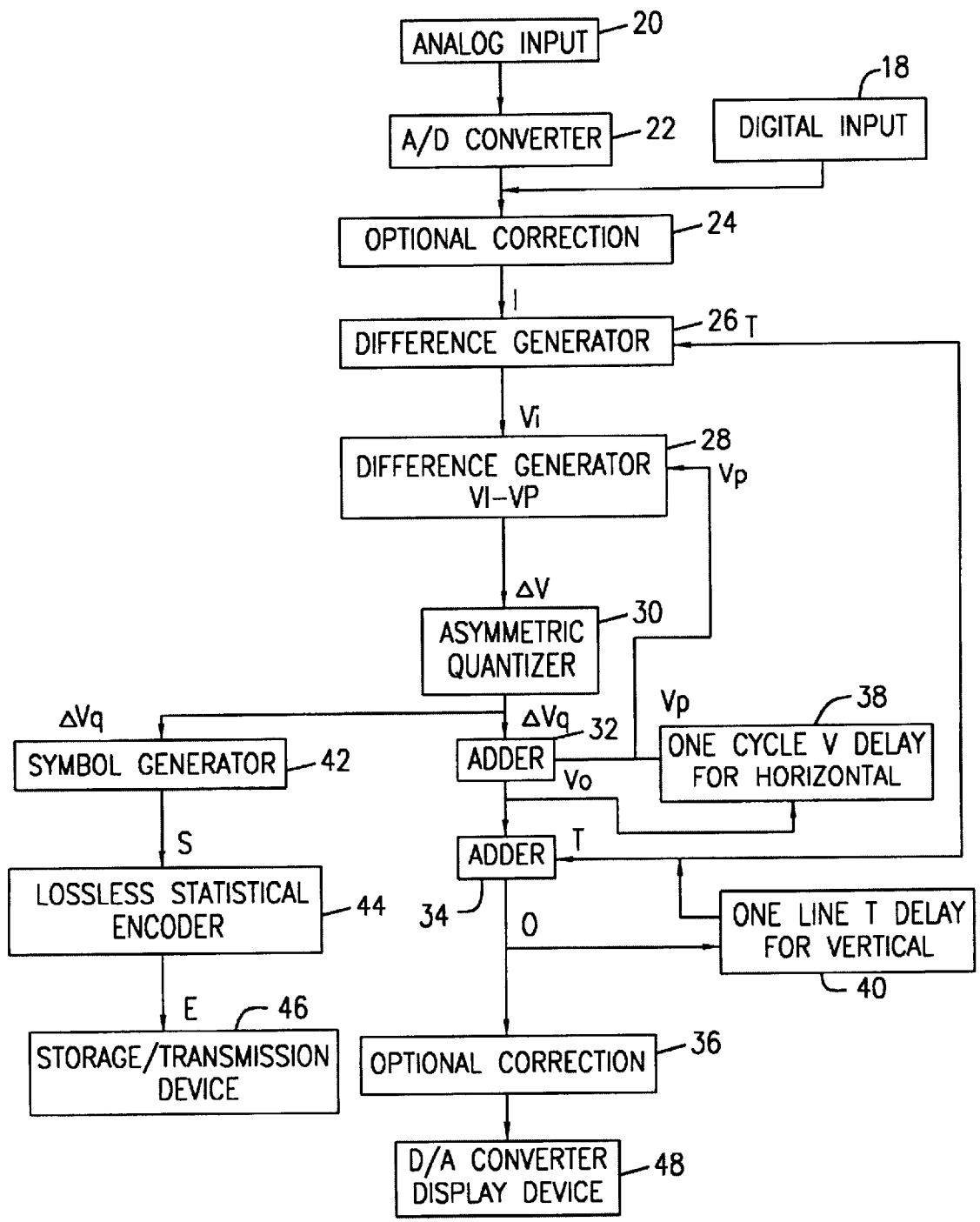
FIG. 2 is a block diagram of a compression system according to the present invention, and Table 2A identifies certain values which are produced in the system of FIG. 2.

FIG. 2 shows a schematic functional block diagram of a compression system for performing the method of a preferred embodiment of the present invention and Table 2A lists the values to be generated by the system of FIG. 2. The image is processed starting with the top left pixel of the image, moving left to right for each row (or line) of pixels, and down each row until all pixels have been processed. There are two delay blocks; a one-cycle delay that holds the previous vertical differential (block 38), and a one-line delay for the previous row of output pixels (block 40). The one-line delay is pre-initialized to a value of 128 (a neutral grey on the scale of 0 to 255); the onecycle delay is pre-initialized to zero.

Initially, a video signal containing data is input in some form (block 20), such as a camera, but it could be from any known source, such as a film scanner or from videotape. The signal is then digitized by an analog-to-digital converter (block 22). The input signal could also originate at this point from a digital source such as computer-generated animation sequences. At block 24, a logarithmic or other correction can be performed so that the random deviation will be constant over the entire range of possible pixel values. A representative correction function is: c=sqr(u*256), where u is the uncorrected input pixel value, and c is the corrected value. The result of this correction we call I, the Input pixel value. At difference generator block 26, a difference is generated by subtracting T (the Top pixel value, which is output by the one-line delay at block 40) from I. This quantity is called Vi (Vertical input differential). At difference generator block 28, Vp (Vertical previous differential, output by the one-cycle delay at block 38) is subtracted from Vi to generate ΔV (delta-Vertical differential).

At block 30, ΔV is quantized using Asymmetric Delta Quantization, utilizing the parameters generated at block 12, of FIG. 1. This is accomplished by providing the actual ΔV to coding parameter block 12 which produces an output determined by the ΔV in accordance with the table of values shown in FIG. 5. The result, ΔVq (delta-Vertical, quantized) is supplied to both adder block 32 and symbol generator block 42. Block 32 sums Vp and ΔVq, generating Vo (Vertical output differential). At adder block 34, Vo is summed with T to produce O (Output pixel). Vo is also supplied to block 38, the one-cycle delay, for storage until the next horizontal pixel is processed. At block 40 (the one-line delay), O is stored for processing the next row of pixels. If a correction took place at block 24, an inverse correction is performed on O at optional correction block 36. A representative inverse correction function would be: c=u^256/256, where again u is the uncorrected output pixel value and c is the corrected value. The output is then sent to a Digital-to-Analog converter (block 48) for display on a video monitor.

Symbol generator block 42 processes ΔVq, converting the chosen delta value into a symbol S (see FIG. 5), suitable for lossless compression at lossless statistical encoder block 44. Each delta value has an associated symbol, and these symbols may be chosen in such a way that more frequently used symbols have lower values, for statistical encoding using a modified Huffinan code (run-length encoding and/or other means known in the art could be used in conjunction or instead). The statistical encoder 44 supplies an encoded bit stream, E. At storage/transmission device 46, the encoded bit stream is saved to a storage device. Alternatively, the bit stream E could be transmitted for real-time video applications such as television transmission or teleconferencing.

Figure 3:
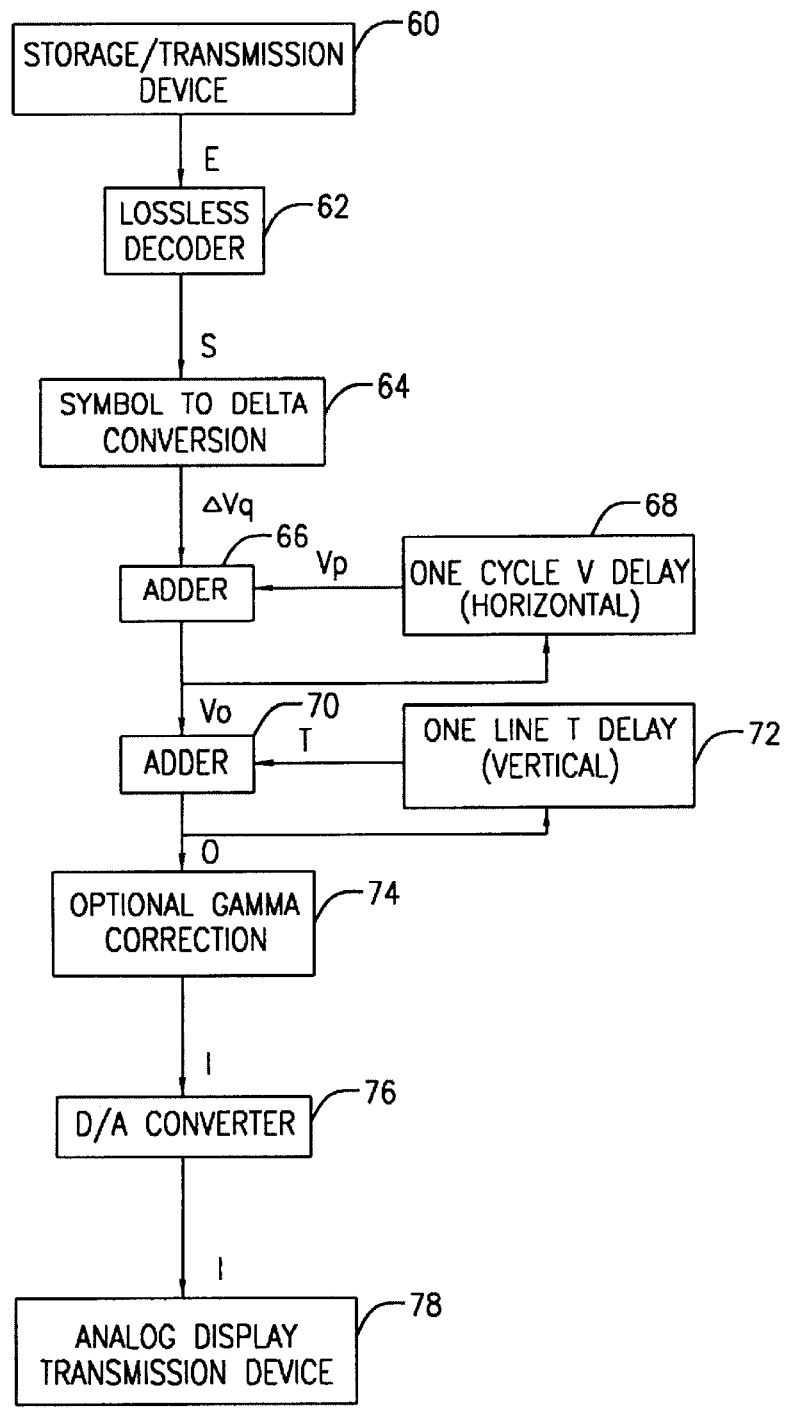
FIG. 3 is a block diagram of a decompression system according to the present invention, and Table 3A identifies certain values which are produced in the system of FIG. 3.

FIG. 3 shows a schematic functional block diagram of a decompression system utilizing the method of a preferred embodiment of the present invention, and Table 3A lists a table of coded values which are generated at different locations on the block diagram of FIG. 3. As in compression, the image is processed starting with the top left pixel, moving left to right and down each row until all pixels have been decompressed. The two delay blocks at 68 and 72 are pre-initialized to the same value used in compression (value=128).

At storage/transmission device 60, the encoded bit stream E is retrieved from a storage device and supplied to lossless decoder 62. Alternatively, the bitstream could come from a data reception device in a real-time video transmission system. In either case, at lossless decoder block 62 the bitstream is decoded using lossless statistical decoding methods corresponding to the statistical encoding methods used in block 44 (FIG. 2). The lossless decoder supplies as an output the symbol S. At block 64, this symbol is translated or converted into the corresponding quantized delta value, ΔVq.

At adder block 66, ΔVq is summed with Vp from the one-pixel delay at block 68, generating Vo. Vo is stored in the one-pixel delay at block 68. At adder block 70, Vo is summed with T (Top pixel), the output from the one-line delay at block 72. The output, O, of adder 70 is stored in the one-line delay for the next row. If a correction was made at block 24 (FIG. 2), an inverse correction is performed at optional gamma connection block 74.

The output is then converted into an analog video signal at digital to analog converter block 76 and sent to a video monitor for display (block 78).

For illustration, nine representative pixels are shown in the table in FIG. 4. These nine pixels are organized into columns 1, 2, and 3 and rows A, B, and C. We will assume that the first row and first column have already been compressed, so that their output values O have been generated. We will now step through the operation of the compression system described in FIG. 2 for the four remaining pixels shown in FIG. 4 using the representative delta quantization parameters in FIG. 5.

Starting with pixel B2, the value 83 is generated as I (the Input pixel) at block 24 (FIG. 2). The value T (Top pixel) is provided by the one-line delay at block 40; for pixel B2, T=46. At block 26, T is subtracted from I to obtain Vi=+37. Vp is provided by the one cycle delay at block 38, and equals +30. (Differential values, which may be negative, will be preceded by +/- for clarity.) At block 28, Vp is subtracted from Vi, producing ΔV=+7(37−30=+7). At block 30, ΔV is quantized using the table of quantization parameters in FIG. 5. Under the ΔV column, we find the range that includes +7 in the sixth row (<=14, >5). The corresponding quantized delta value ΔVq is +8. At block 42, we generate a symbol S corresponding to our chosen ΔVq by looking in the third column in FIG. 5; for our ΔVq value of +8, S=2. At block 46, we encode symbol S into a series of bits using the corresponding bit series in FIG. 5 under column E. For S=2, the bit series 1100 will be encoded. This series of bits will then be stored or transmitted at block 46.

At block 32, ΔVq is summed with Vp to produce Vo=+38. This value is stored in the one-cycle delay at block 38 for processing the next pixel. At block 34, T (from the one-line delay at block 40) and Vo are summed, producing output pixel O=84. O is stored in the one-line delay at block 40 for processing the next row of pixels.

At blocks 36 and 48, output value O is corrected, converted into an analog signal and sent to a monitoring device.

Repeating these steps for pixels B3, C2 and C3, we generate output values O of 95, 91 and 104 respectively. Symbols S for these pixels are 3, 1 and 0; encoded bit series E are 1101, 10, and 0. It can be seen that the four pixels which originally required 8 bits of storage each for a total of 32 bits have been reduced to 11 bits of information for storage or transmission. It will also be noted that the largest discrepancy between input pixel and output pixel values is +3, which is within the decoding range.

It has been found in the use of prototype systems that typical video image material will average less than 1.75 bits per pixel using the present invention, because of the predominance of small ΔVq values which can be encoded with one or two bits as shown. Further refinements include the use of color subsampling and interpolation techniques well known in the art, to compress color video material; subsampled chroma planes can be further compressed using the present invention with excellent results. The use of bi-directional 4 to 1 color subsampling has been shown to produce acceptable results while adding about 12.5% to the total storage requirement. At resolutions of 320×240 pixels at 30 frames a second and 384×240 at 24 frames a second, typical video and film source material has been successfully compressed at bandwidths under 4.7 megabits/sec with excellent results. Further refinements have included 2 to 1 interpolation for effective resolutions up to 768×480, which exceeds the resolution of current NTSC broadcast standards.

Figure 6:
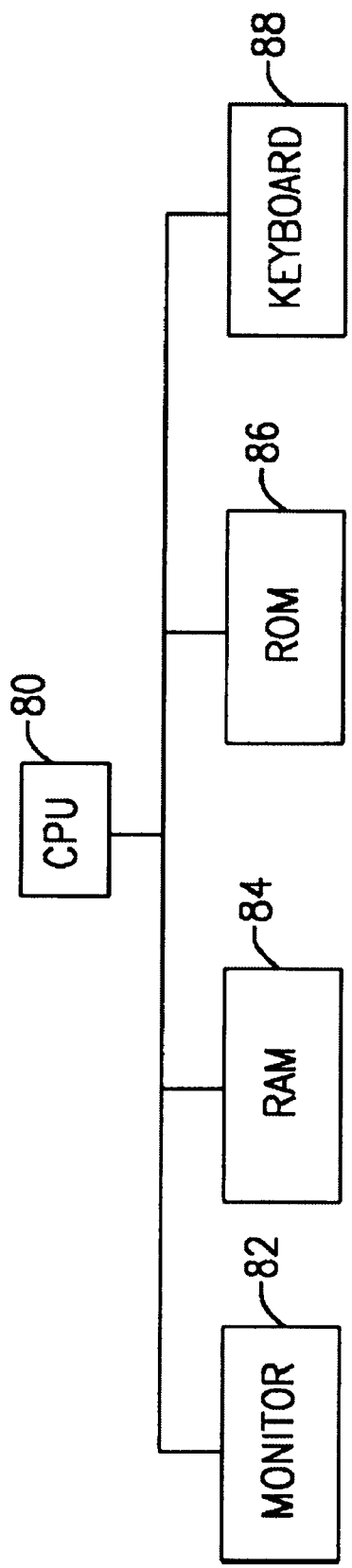
FIG. 6 is a block diagram of a digital computer run by software which can implement the present invention.

FIG. 6 is a block diagram showing a computer system which can enable the present invention to be run with software operating the computer. In a preferred embodiment, an IBM PC is employed with an Intel i750-based Action-Mediall digital video board. The i750 board is inserted into an expansion slot in the IBM PC. The i750 chip is programmable, and the IBM PC is used to operate the system of this invention. CPU 80 is connected to a bus which interconnects monitor 82, RAM 84, ROM 86 and a keyboard 88. These elements of the IBM PC are employed with the Intel i750 chip to be programmed to perform the operations of the present invention.

Among the important benefits of this HV system invention is that simple arithmetic steps are required to calculate the coded output values for each pixel location. Since asymmetric values are used, the avoidance of posterization is achieved, and the benefits of Huffinan coding is also realized. Very few computational steps are required so that minimal memory and circuitry or software is required to perform the methods of the present invention.

It is also contemplated that the method of the invention could be used with digital signals produced by a computer. Of course, these signals would have no inherent decoding range. With computer-generated images, the stark computer-perfect look could be transformed into a more natural looking image, with an artificial decoding range chosen by the user. Further, digital signals may be stored in more compressed fashion to achieve cost savings using the invention. By employing the decompression invention to digital data compressed by the method of this invention, such cost savings can be realized while providing desirable video displays. The present invention may find favorable use with movies on digital disks, karaoke machines and other audio visual apparatus.

Further, this invention can vary the amount of compression and alter the quality of the final image by trading between the compression parameters, the amount of data transmitted and the quality of the decompressed visual images.

In summary, this invention possesses several important advantages over competing digital compression systems. Video is more than pictures moving on the screen. The subjective "look" or "texture" of video and film, the grain and noise quality are extremely important to the artists working with this medium. Digital artifacts are obvious and unacceptable. The look of the image produced with the present invention is very natural and any degradation during the compression process is graceful and 'analog', without pixellation, jagged edges, blockiness or shower glass effects.

Other compression techniques are computation-intensive, especially during compression; it often takes many hours of number crunching to compress one minute of video. Certain applications such as live news and sports broadcasting cannot tolerate compression delays. The present system is inherently efficient for both compression and decompression, addressing the needs of cable television as well as allowing the possibility of digital camcorders and VCRs.

Another aspect of the present invention relates to the manner in which error due to the compression process is distributed across the image, approximating the characteristic noise distribution of analog processes such as film. This is achieved by the HV delta encoding process that tends to distribute the error downwardly and to the right. In this manner the error is distributed randomly in both the horizontal and vertical directions.

A device implementing the present invention will cost less to manufacture and use than other alternatives, requiring at least an order of magnitude fewer gates in an ASIC implementation. The present invention will not require multiple frame buffers (other systems can require 4 to 12 megabytes of RAM), further reducing the cost of the final product. The elegance and simplicity of implementation make it possible to achieve a quick design cycle.

The present invention compresses each frame of video independently. This means that true random access to any frame of video is possible: the user can instantly switch channels or interact in real time with stored video. A truly interactive non-linear environment is possible. Interframe compression schemes such as the proposed MPEG3 system cannot even attempt to play video in reverse.

While the embodiment shown and described is fully capable of achieving the objects and advantages of the present invention, it is to be understood that this embodiment is shown and described for the purpose of illustration and not for limitation.

What is claimed:

1. A method of operating a digital computer, a data structure corresponding to an image having a plurality of pixels arranged in two dimensions, said method comprising the steps of:
    (a) selecting the data from said structure corresponding to adjacent lines of pixels of said image;
    (b) calculating the vertical differentials between said adjacent lines of pixels using a computer, each vertical being the difference between the value of a first pixel and second pixel, said first pixel being a pixel in a first line of said adjacent lines, and said second pixel being a pixel in a second line of said adjacent lines, said second pixel being the pixel in said second line closest to said first pixel;
    (c) calculating a set of deltas from said vertical differentials using a computer, each of said deltas representing the difference between the value of a vertical differential and the value of a second, adjacent vertical differential; and, (d) selecting a quantized delta from a set of predetermined quantized deltas to represent each of said deltas being in one of a plurality of ranges, the quantized delta selected being closest to the value of the respective calculated delta, wherein said plurality of ranges comprising negative ranges and positive ranges, said negative ranges being $NR_1$, $NR_2$ ... $NR_y$ wherein y is an integer, and said positive ranges being $PR_1$, $PR_2$, ... $PR_y$, each of said negative ranges being a series of negative numbers, and each of said positive ranges being a series of positive numbers, said set of predetermined quantized deltas comprising negative quantized deltas and positive quantized deltas, said negative-quantized deltas being $NQD_1$, $NQD_2$, ... $NQD_y$ and said positive quantized deltas being $PQD_1$, $PQD_2$, ... $PQD_y$, said quantized deltas being used to represent said deltas such that a negative quantized delta $NQD_x$ is used to represent any of the deltas in a negative range $NR_x$, and a positive quantized delta $PQD_x$ is used to represent any of the deltas in a positive range $PR_x$, wherein x is an integer between 1 and said y, and wherein said set of predetermined quantized deltas is asymmetric such that the absolute value of at least one $NQD_x$ is different from the absolute value of $PQD_x$.

2. A method of operating a digital computer to compress a data structure, and method comprising the steps of:

(a) accessing at least a portion of said data structure, said data structure having sequences of values in each dimension, said sequences being rows and columns when said data structure is a two dimensional data structure;

(b) selecting adjacent values from adjacent sequences in said data structure, said adjacent sequences having at least a first sequence and a second sequence;

(c) calculating a first differential between said adjacent sequences using a computer, said first differential being the difference between a first value in said first sequence, and the first value in said second sequence;

(d) repeating step (c) to calculate the next differentials between said sequences, each of said next differentials being the difference between the next value in said first sequence, and the next value in said second sequence;

(e) calculating a set of deltas from said differentials using a computer, each of said deltas representing the difference between the value of a differential and the value of said next differential; and (f) selecting a quantized delta from a set of predetermined quantized deltas to represent each of said deltas, each of said deltas being in one of a plurality of ranges, the quantized delta selected being closest to the value of the respective calculated delta.

wherein said plurality of ranges comprising negative ranges and positive ranges, said negative ranges being $NR_1$, $NR_2$ ... $NR_y$ wherein y is an integer, and said positive ranges being $PR_1$, $PR_2$, ... $PR_y$, each of said negative ranges being a series of negative numbers, and each of said positive ranges being a series of positive numbers, said set of predetermined quantized deltas comprising negative quantized deltas and positive quantized deltas, said negative quantized deltas being $NQD_1$, $NQD_2$, ... $NQD_y$ and said positive quantized deltas being $PQD_1$, $PQD_2$, ... $PQD_y$, said quantized deltas being used to represent said deltas such that a negative quantized delta $NQD_x$ is used to represent any of the deltas in a negative range $NR_x$, and a positive quantized delta $PQD_x$ is used to represent any of the deltas in a positive range $PR_x$, wherein x is an integer between 1 and said y, and wherein said set of predetermined quantized deltas in asymmetric such that the absolute value of at least one $NQD_x$ is different from the absolute value of $PQD_x$.

* * * * *